US010895675B2

(12) United States Patent
Sharp et al.

(10) Patent No.: US 10,895,675 B2
(45) Date of Patent: Jan. 19, 2021

(54) CHROMATIC POLARIZATION FILTERING THAT IS INPUT SPECIFIC

(71) Applicants: Gary D. Sharp, Boulder, CO (US); Anthony D. McGettigan, Santa Rosa, CA (US)

(72) Inventors: Gary D. Sharp, Boulder, CO (US); Anthony D. McGettigan, Santa Rosa, CA (US)

(73) Assignee: Gary Sharp Innovations, LLC, Boulder, CO (US)

( * ) Notice: Subject to any disclaimer, the term of this patent is extended or adjusted under 35 U.S.C. 154(b) by 462 days.

(21) Appl. No.: 15/952,336

(22) Filed: Apr. 13, 2018

(65) Prior Publication Data
US 2018/0299601 A1    Oct. 18, 2018

Related U.S. Application Data

(60) Provisional application No. 62/484,983, filed on Apr. 13, 2017.

(51) Int. Cl.
*G02B 5/30* (2006.01)
*G02B 5/28* (2006.01)
*G03B 11/00* (2006.01)
*G02C 7/10* (2006.01)
*G02C 7/12* (2006.01)

(52) U.S. Cl.
CPC .......... *G02B 5/3025* (2013.01); *G02B 5/28* (2013.01); *G02B 5/3083* (2013.01); *G02C 7/107* (2013.01); *G02C 7/12* (2013.01); *G03B 11/00* (2013.01)

(58) Field of Classification Search
CPC .......................... G02B 5/3025; G02B 5/3083
USPC .......................... 359/487.02, 488.01, 389.07
See application file for complete search history.

(56) References Cited

U.S. PATENT DOCUMENTS

| 3,433,553 | A | * | 3/1969 | Peters | G02B 5/30 |
| | | | | | 359/489.07 |
| 3,647,278 | A | * | 3/1972 | Makas | G02B 27/281 |
| | | | | | 359/489.03 |
| 3,663,089 | A | * | 5/1972 | Makas | G02B 27/281 |
| | | | | | 359/352 |
| 5,929,946 | A | * | 7/1999 | Sharp | G02B 5/3083 |
| | | | | | 348/E5.133 |

(Continued)

FOREIGN PATENT DOCUMENTS

| JP | 09138371 A | 5/1997 |
| JP | 2008529095 A | 7/2008 |

OTHER PUBLICATIONS

International Search Report for International Application No. PCT/US2018/027453, dated Aug. 2, 2018.

*Primary Examiner* — Ricky D Shafer
(74) *Attorney, Agent, or Firm* — Robert G. Crouch

(57) ABSTRACT

Optical filters that enhance image quality by exploiting differences in the wavelength dependence of the spectral power distribution (SPD) and the degree of polarization between elements in a scene in order to preserve, and more preferably enhance, color-contrast between one or more salient objects in the scene and/or a salient object and a background. The higher degree of polarization may be associated with the background or the one or more salient objects. Color contrast is associated with one or more of a difference in saturation, a difference in hue, and a difference in lightness.

21 Claims, 11 Drawing Sheets

(56) References Cited

U.S. PATENT DOCUMENTS

| | | | | |
|---|---|---|---|---|
| 5,999,239 A | * | 12/1999 | Larson | G02B 3/005 349/96 |
| 2012/0206806 A1 | | 8/2012 | Weber | |
| 2014/0233105 A1 | | 8/2014 | Schmeder et al. | |
| 2016/0291340 A1 | | 10/2016 | Sharp | |

* cited by examiner

CHROMATIC POLARIZATION FILTERING THAT IS INPUT SPECIFIC

CROSS-REFERENCE TO RELATED APPLICATIONS

This application claims priority to U.S. Provisional Application No. 62/484,983, filed Apr. 13, 2017, the contents of which are incorporated herein by reference in its entirety.

BACKGROUND

It is well known that specular reflections from natural and synthetic objects can increase the degree of polarization (DoP) when they are illuminated by unpolarized light. This frequently occurs in natural scenes when objects are directly illuminated off-normal by the sun, including the sky, a body of water, ice, and synthetics such as glass and painted surfaces. Direct sunlight reflected from such surfaces tends to be partially polarized, directional, and intense, relative to the underlying volume scatter, which can tend toward quasi-Lambertian. Visual observation of such objects can be uncomfortable, and the glare can overwhelm the volume scatter component, masking underlying information. Moreover, the polarized glare can be substantially wavelength independent (achromatic), and as such, can desaturate any color associated with volume scatter.

The prior art solution is to use a high polarizing efficiency (PE) neutral linear polarizer to maximally extinguish the component of the electric field that lies orthogonal to the plane of incidence. This makes it more comfortable to view, and when applicable, reveals sub-surface information. This information may be associated with physical sub-surface objects (e.g. the bottom of a stream), or it may be associated with the texture and color of a relatively homogeneous surface (e.g. a beautiful lacquer automotive paint job). This filtering is highly effective, provided that the polarizing efficiency of the polarizer is high (e.g. >99%), the absorption axis is accurately aligned to the polarized glare axis, and the DoP of the scattered light is high. While high PE is straightforward to achieve, objects are rarely optimally oriented, and there is usually a non-trivial achromatic glare contribution that is not polarized. Such is the case when the illumination and observation angles are small with respect to a specular surface normal.

The use of a polarizing sunglass lens is rejected by some consumers for two common reasons; one is that complete elimination of polarized glare can extinguish information-bearing aspects in the image (e.g. glare can be used to identify ice on the road). Another is that highly polarized glare can create binocular artifacts, sometimes described as a "strange 3D effect". This artifact stems from geometrical differences between the orientations of polarized glare entering each eye, resulting in a conflict in perceived lightness. The artifact is most pronounced with strong and highly polarized glare (e.g. direct sunlight reflected off-normal from a highly specular object), and the polarizing efficiency of the eyewear is high.

When polarizing lenses are most effective, they create high extinction of polarized glare. Under these sensitive conditions, small changes in geometry can cause huge changes in transmitted glare. This may be associated with the object (e.g. inhomogeneity in the surface normal), the source (e.g. filtering of sunlight through leaves), or the analyzer (e.g. head movement). In the real world, these variables can cause intensity modulations which can be monocular, binocular, or both. Such temporal artifacts can be unpleasant and distracting.

Filters used in eyewear have also attempted to enhance the contrast between an object and a background using wavelength selective transmission spectra. General-purpose lenses such as narrow-band dichroic filters, dyes, or rare-earth doped glass are known that can, for example, notch out the spectral cyan, the spectral yellow, or both. This can enhance color contrast while permitting a color-balanced transmission, since a balanced transmission of red, green, and blue is a metamer of broad-band gray.

Other application specific lenses have been previously disclosed, where attempts were made to increase contrast between specific objects and backgrounds. For example, there are lenses intended specifically for sports such as golf, tennis, and skiing that concentrate on an aspect of color in a scene to give the wearer more information. Polarization and spectral management functions are frequently merged into a single film, because it is cost effective to make high PE polarizers using dyes with desired tints. However, given the usual goal of high achromatic PE, the transmission spectrum along the absorption axis is not a parameter that is typically exploited to determine lens tint.

It is against this background that the techniques described herein have been developed.

SUMMARY

Disclosed herein is an optical filter receptive of incoming light having at least a chromatic unpolarized volume scatter component and a polarized surface scatter component, the unpolarized volume scatter component having a first spectral power distribution, wherein the polarized surface scatter component has an angular orientation. The filter includes one or more optical elements that together have an orientation-sensitive spectral transmission function for filtering the polarized surface scatter component of the incoming light differently from the unpolarized volume scatter component of the incoming light.

The optical filter may be an eyewear lens. The optical filter may be a camera filter. The orientation-sensitive spectral transmission function may increase the chroma of the polarized surface scatter component of the incoming light.

The optical filter may also receive light from a salient scene element with a second spectral power distribution (SPD) and wherein the optical filter may increase the color difference between the first and second received light. The first SPD may represent a blue tennis court and the second SPD may represent a yellow tennis ball. The first SPD may represent a basketball court and the second SPD may represent a basketball. The first SPD may represent green foliage and the second SPD may represent a golf ball. The first SPD may represent a body of water and the second SPD may represent a water craft. The first SPD may represent the sky and the second SPD may represent a cloud. The optical filter may substantially preserve the perceived color of neutral objects.

The orientation-sensitive spectral transmission function may shift a color coordinate of the polarized surface scatter component of the incoming light toward a color coordinate of the chromatic unpolarized volume scatter component of the incoming light. The optical filter may further contain a spectral transmission function that filters both the chromatic unpolarized volume scatter component of the incoming light and the polarized surface scatter component of the incoming light in a manner that increases the color difference between the chromatic unpolarized volume scatter component of the incoming light and the polarized surface scatter component of the incoming light.

The optical filter may further contain a spectral transmission function that filters both the chromatic unpolarized volume scatter component of the incoming light and the polarized surface scatter component of the incoming light in a manner that increases the saturation of at least one of the chromatic unpolarized volume scatter component of the incoming light and the polarized surface scatter component of the incoming light. The optical filter may include a first stage and a second stage, wherein the first stage filters the polarized surface scatter component of the incoming light and the second stage filters at least one of the chromatic unpolarized volume scatter component of the incoming light and the polarized surface scatter component of the incoming light. The filtering differently may include the spectral transmission function being different.

Also disclosed is an optical filter receptive of incoming light having at least a chromatic unpolarized volume scatter component and a polarized surface scatter component, wherein the polarized surface scatter component has an angular orientation. The filter includes a chromatic polarizer with an absorption axis oriented parallel to the angular orientation of the polarized surface scatter component. A transmission spectrum along the absorption axis of the chromatic polarizer shifts a color coordinate of the polarized surface scatter component of the incoming light toward a color coordinate of the unpolarized volume scatter component of the incoming light.

Also disclosed is an optical filter receptive of incoming light having at least a chromatic unpolarized volume scatter component and a polarized surface scatter component, wherein the polarized surface scatter component has an angular orientation. The filter includes one or more input retarders configured to produce a wavelength-dependent state-of-polarization; and a linear polarizer receptive of light passing through the one or more input retarders, the linear polarizer having an absorption axis oriented either parallel to or perpendicular to the angular orientation of the polarized surface scatter component of the incoming light. The transmission spectrum of the optical filter shifts a color coordinate of the polarized surface scatter component of the incoming light toward a color coordinate of the unpolarized volume scatter component of the incoming light.

A spectral transmission of the optical filter is determined only by a transmission function of the linear polarizer for the unpolarized volume scatter component of the incoming light. A spectral transmission of the optical filter is determined both by a transmission function of the linear polarizer and by a transmission function of the input retarders for the polarized surface scatter component of the incoming light.

DETAILED DESCRIPTION

Figure 1:
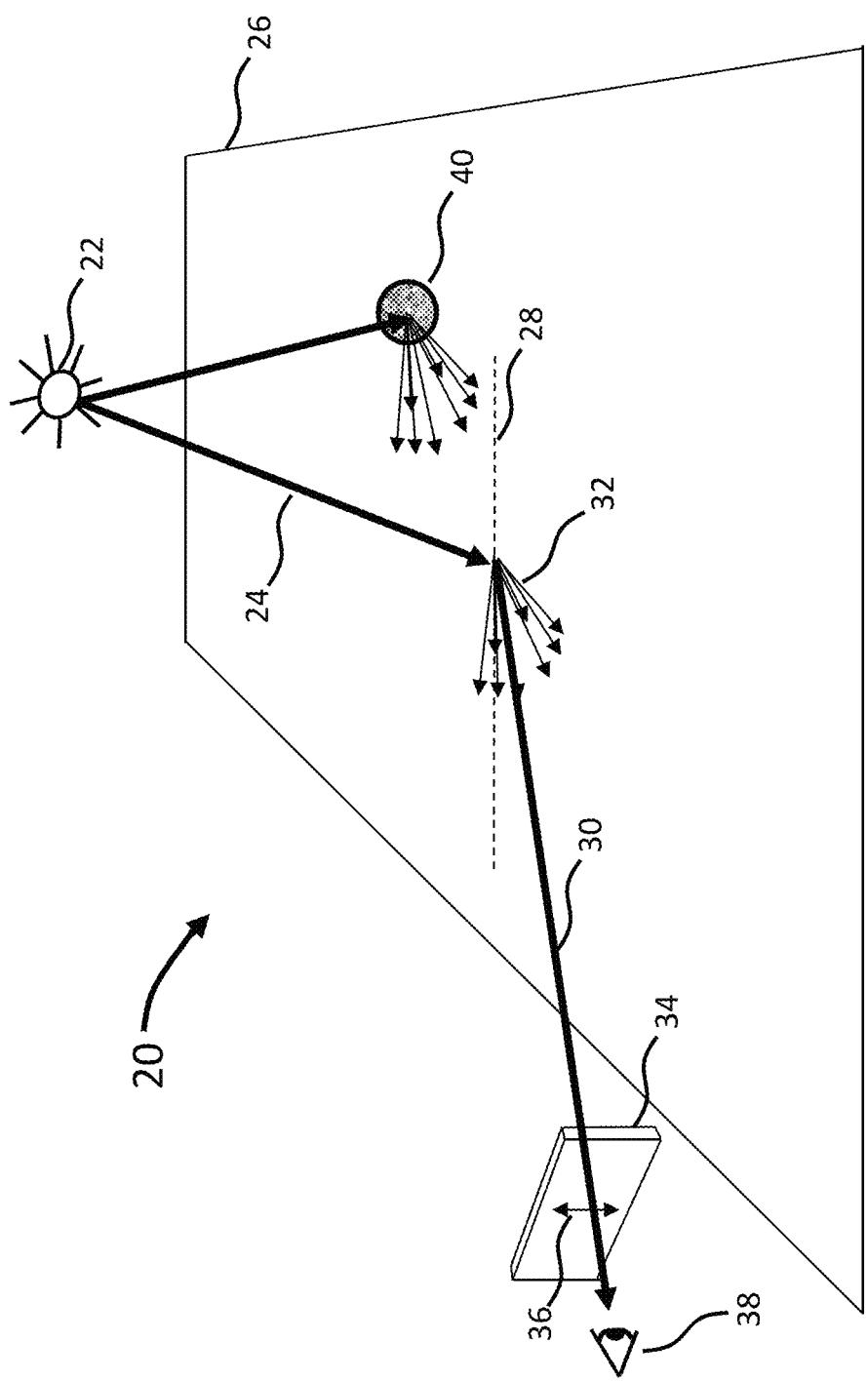
FIG. 1 shows a configuration illustrating use of the inventive filter.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Some of the acronyms used herein include:
DoP—Degree of Polarization
HEB—High Energy Blue
JND—Just Noticeable Difference
PE—Polarization Efficiency
PSS—Polarized Surface Scatter
SoP—State of Polarization
SPD—Spectral Power Distribution
SSE—Salient Scene Element
USS—Unpolarized Surface Scatter
UVS—Unpolarized Volume Scatter
VLT—Visible Light Transmission
WFE—Wide-Field Element Filters are disclosed that merge polarization and color management in order to improve one or more aspects of a scene. The approach is summarized as follows:

Under a specific illumination, scene elements produce spectral power distributions (SPDs) that can be decomposed into an unpolarized term, and a polarized term. The SPD is thus the sum of these terms.

The polarized portion of the SPD is typically determined by surface scatter, referred to herein as polarized surface scatter (PSS). It tends to be linearly polarized, broad-band achromatic, with orientation determined by geometry (illumination/observation directions, and surface normal). The degree of polarization (DoP) is generally determined by statistics associated with the illumination, and the surface morphology.

The unpolarized portion is typically determined by two contributions, including a volume scatter that tends to produce the color (hue, saturation) perceived by the vision system. This portion of the SPD is referred to herein as unpolarized volume scatter (UVS). The UVS is in many instances quasi-lambertian, or at least has a scatter profile that is much broader in angle space than surface scatter. The other contribution is an unpolarized surface scatter (USS), which tends to be broad-band achromatic and is also dependent upon geometry and surface morphology. The total unpolarized portion of the SPD is the sum of these contributions.

In some instances, there are statistical correlations between scene elements that can generate a significant PSS and the color of the UVS.

Under these circumstances, wavelength selective filtering of the PSS, determined by the characteristics of the UVS color can be visually beneficial. The benefits can take several forms depending upon the details of the scene elements, and the optimization criteria.

Filter optimization can be based on performance metrics associated with visual comfort and safety, the pleasantness of visual appearance, and enhanced ability to perform a task (e.g. a sport, sorting, or harvesting).

Filter optimization is very effective when quantifiable performance metrics are identified (e.g. enhancement of a perceived color difference between two salient scene elements).

Filter optimization tends to be more effective when weighting is assigned to the significance of salient scene elements (e.g. objects, backgrounds, and textures).

Consistency in the statistics of the UVS color of salient scene elements tends to make the optimization more tractable.

Candidate optimized filter functions should be scrutinized relative to appearance of the ensemble of scenes and scene elements. For instance, a filter that optimizes a color difference between two scene elements may create an objectionable appearance of lower-weight scene elements (e.g. a dramatic shift in the color of neutral scene elements).

More detailed description of the techniques disclosed herein is done by way of examples.

Optimization of a filter function is statistical in nature. Variables include the statistics of lighting conditions, salient scene elements, the ensemble of input scene elements, observation conditions, the observer vision system, and consumer preference. The examples subsequently provided illustrate how these variables can be taken into account and how an optimization can be accomplished. It is understood that these examples are meant to be illustrative and are by no means a limitation imposed on the scope of the invention.

Described are optical filters useful for (e.g.) eyewear and electronic image capture that enhance contrast between two or more salient scene elements under various lighting conditions. Lighting can be synthetic (e.g. lamps) or natural, with the latter tending to exhibit greater variability over the range of usage conditions. For the latter, spectral, angular, and spatial characteristics of scene illumination depend upon location, time of day, time of year, scene geometry (e.g. occlusion/shadow), and whether direct or indirect. Direct sunlight tends to make the appearance of scene elements more dependent upon geometry, with greater probability for significant PSS contribution. It also tends to create scenes with a greater statistical dynamic range. Indirect sunlight can result from anything causing the scattering of light prior to reaching the scene elements, which can impact several characteristics. The impact of clouds, for instance, can be to dramatically reduce the illuminance, to shift the color temperature, and to place greater emphasis on the illumination produced by secondary scatterers that tend to have a much broader angular distribution.

It is to be understood that a filter design that performs optimally under direct sunlight (with greater probability of high PSS), may have a lesser performance impact under conditions of, for example, diffuse illumination. For the inventive filter to have a significant performance benefit there is a lighting usage scenario under which significant PSS is present, which is often the case for outdoor applications. To avoid repeatedly specifying this throughout the specification, subsequent analysis assumes that such lighting conditions are or can be relevant.

The techniques disclosed herein leverages at least one salient scene element (SSE) that produces significant PSS in combination with UVS that is substantially chromatic/colorful. Moreover, the design preferably filters the PSS in a manner that takes into account the UVS color in order to improve an aspect of appearance. Again, improvement metrics can take several forms depending on the application.

Herein, the SoP is used as a means of filtering the PSS independently of the UVS. That is, polarization-independent filters (such as isotropic dyes, dichroics or rare-earth ions) act on both the PSS and the UVS, while the PSS can experience a substantially independent filtering with alternative technologies. This independence allows the filter to severely distort the PSS color without changing the lens tint, associated with substantially unpolarized inputs. Note that this differs from a typical sunglass lens, which attempts to strip away the PSS rather than allow it to contribute constructively to the SSE.

Another aspect of the techniques disclosed herein is that the polarization efficiency (PE) of a filter can be (chromatically) selected in order to achieve a compromise between identifying glare, and delivering sub-surface information to a viewer when applicable. For instance, a linear polarizer that transmits a small amount of lumen-weak blue light can allow identification of surface scatter, without overwhelming the vision system or making it difficult to observe sub-surface information. Such a leakage can also address issues associated with monocular artifacts (e.g. glare temporal modulation) and binocular artifacts (e.g. geometrical glare difference), which can occur with conventional polarizing sunglasses.

SSEs may under certain lighting conditions also generate a significant USS in combination with a chromatic UVS. The USS is much like the PSS in that it has the effect of reducing the chroma/saturation of the UVS. If performance metrics call for preserving/enhancing chroma of the UVS, the filter may additionally modify the USS in a manner that facilitates this. Again, the filter function takes into account the characteristics of the UVS. The filter may use polarization interference, or any number of other filter technologies as deemed suitable for the requirements. Since the DoP is the same for both the USS and the UVS, there is no independence of the filter transmission function. As such, any filter that acts on unpolarized scene elements can modify the lens tint, and hence the white-point.

A filter function that is optimized to improve the appearance of one or more SSEs must also accommodate the ensemble of relevant scene elements in a visually acceptable manner. In general, the vision system can accommodate a range of lens tints by exploiting chromatic correction (color constancy). In many instances, tinted lenses (e.g. brown and rose) are actually preferred over lenses that preserve color fidelity. But there are limitations, and large departures from neutral, driven by first-order optimization criteria, may be visually unpleasant. For a general purpose lens where a viewer could observe anything, there are limits to the range of lens tints that consumers will accept/prefer. And even a more bounded set of inputs that includes neutral grays can limit the range of tints that consumers will accept. For dedicated filters with a further bounded set of inputs, there is a potential to optimize a filter function with more freedom, since the constraints of color constancy may be relaxed.

The inputs for the optimization can come from computer models, or from laboratory/field measurements of SSEs. The SPD of a salient scene element can be acquired in the field using an instrument such as a PR670 spectroradiometer (Radiant-Zemax). By placing a rotatable neutral polarizer in front of the instrument, the relevant components can be measured by identifying the transmission minima/maxima. Using a high polarizing efficiency (PE) neutral polarizer, the SPD can be measured both parallel ($S_1$), and perpendicular ($S_2$) to the plane of incidence. The unpolarized and polarized terms are given by:

$$(UVS+USS)=2S_1/T_p, PSS=(S_2-S_1)/T_p \quad (1)$$

Where $T_p$ is the wavelength dependent polarizer transmission perpendicular to the absorption axis.

In direct sunlight, the PSS may be extremely high in lightness relative to the UVS because it tends to be relatively directional, broad-band, and efficiently scattered. And depending upon geometry of illumination/observation and the details of the scattering medium, it can have a relatively large polarized component orthogonal to the plane of incidence. Obviously, a key reason for sunglasses in general, is to reduce the light level to a range that is acceptable for the vision system. For example, a typical high-ambient sunglass lens may reduce the photopic light level by more than 90%. Additionally, in some cases the underlying volume scatter is information-bearing and is otherwise dwarfed by the polarized glare term (e.g. seeing the bottom of a stream). This argues for a strongly polarizing lens to eliminate polarized glare that washes out the image. Conversely, there can be information contained in the glare component (e.g. cyclists/motorists would like to identify ice patches, or light scattered from water filling a pot-hole). Furthermore, a cyclist/motorist may rely upon resolving texture associated with the spatial distribution of PSS as a depth cue (e.g. texture gradient). This tends to argue for not wearing polarized glasses. Today, a user must currently select between products that either fully transmit light independent of DoP, or fully block any polarized glare.

FIG. 1 shows an example of a configuration (20) illustrating the techniques taught herein. Light from a visible source (22) (e.g. the sun) directly illuminates a scene along a ray direction (24). The ray illuminates a surface/background (26), forming a plane-of-incidence direction (28). Directional quasi-achromatic polarized-surface-scatter (PSS) (30) virtually follows the mirror direction of the scattering surface. A broader angular distribution of largely unpolarized volume scatter (UVS) (32) is also produced, associated with a first spectral-power-distribution (SPD). This SPD is largely responsible for determining the perceived color of (26). Filter (34) is placed such that it receives the PSS and a portion of the first UVS. The filter (34) has an orientation sensitive filter portion (36) that determines the spectrum of PSS transmitted to the eye/sensor (38), which may or may not modify the transmission spectrum of first UVS light. The filter may additionally contain a filter portion that is insensitive to the state-of-polarization. Light may additional impinge on an object (40), which in this case creates virtually only UVS, associated with a second spectral power distribution, and hence a second perceived color. The filter may additionally modify the transmitted first and second SPD, such that additional color separation is produced, enhancing color contrast and saturation.

Case 1: Single SSE with Chromatic UVS

Consider a single SSE that has a UVS that is substantially chromatic. In the absence of filtering, the PSS can be locally intense and can strongly desaturate the UVS color. A filter according to the techniques disclosed herein that acts only on the PSS can have a color that is, for example, similar in hue to the UVS, perhaps with even higher chroma. Such a filter can also preserve color fidelity for any unpolarized input if desired. However, it does not improve the chroma when USS is present, which would require additional filtering. Case 1 could apply to a standardized color tennis court, a clear blue sky, or a body of water.

Case 2: Two SSEs Each with Chromatic UVS

Consider a pair of SSEs, at least one of which has a UVS that is substantially chromatic. Among other possible forms, this includes a pair of discrete classifiable objects, or a single object on a homogeneous background. The performance metrics can also take several forms, with a common requirement being to enhance some aspect of contrast between the SSEs.

While the unpolarized volume scatter of SSEs can have SPDs with common spectral features, the assumption here is that there is likely a non-overlapping region. Inputs could include SSEs with visually distinctive hue, saturation and lightness (HSL), and it can include SSEs that are virtual metameric matches. The latter is the set of SSEs that appear virtually the same under a particular lighting, but with differing SPDs. As an example of the former, a bluish object can exist in juxtaposition with an amber object, each with an achromatic PSS. The UVS spectra can overlap heavily in the spectral cyan, and each may have a moderate chroma value. A filter that acts only on the PSS can pass the blue and spectral yellow, while attenuating the spectral cyan and a portion of red/green. Within the spatial region of substantial PSS, this filter can increase the superimposed chroma of each, while increasing the color separation between them. As before, the filtered PSS can complement the UVS colors, which can improve the overall appearance. Again, because the filter acts only on polarized inputs, it can preserve the fidelity of all unpolarized inputs. An example of this can include the inner and outer colors (e.g. green and red) of a tennis or basketball court.

Case 3: Two SSEs, One with PSS

This is Case 1 with an additional SSE that has insignificant PSS. The latter may or may not be chromatic or have significant USS. The SSEs could represent, for example, discrete classifiable objects, an object on a background, or a texture with spatial distribution of DoP. Examples include white-caps on the sea, white clouds in a blue sky, certain stone aggregate surfaces, or a tennis ball on a court.

Filter Technology

The techniques disclosed herein use a technology capable of filtering a polarized input and an unpolarized input independently. Examples include, for example, polarization interference and chromatic polarizers.

A polarization interference filter (PIF) uses either a polarized input (relevant to the techniques disclosed herein) or an input polarizer. This is followed by one or more retarders (or phase-difference films), and an analyzing polarizer. In this context, a wavelength dispersive retarder is oriented at ±45° to the PSS, which creates two waves with a wavelength dependent retardation. The analyser (typically oriented parallel or perpendicular to the input polarization), absorbs wavelengths of a particular phase difference, and transmits wavelengths with a relative it phase shift. The transmission function is sinusoidal, like any two-beam interferometer. Unpolarized inputs are not affected by the retarder, and the transmitted spectrum is only modified by the wavelength dependence of the polarizer transmission (which can be quite neutral).

An alternative to the PIF is to use one or more chromatic polarizers. Chromatic polarizers are polarizers that have strong wavelength dependence to their polarizing efficiency. Basically, they are designed to leak a prescribed amount of light at certain wavelengths along the absorption axis. For an unpolarized input, this increases the throughput at wavelengths corresponding to low PE. Thus, a single chromatic polarizer can contribute significantly to the tint of the lens unless a compensating filter is added. In the event that the design calls for low PE in a particular band that shifts the tint of the lens outside of a range considered acceptable with respect to chromatic compensation, a second chromatic polarizer can be added. The role of the second chromatic polarizer, crossed with the first, is to shift the tint to an acceptable/desirable color point for unpolarized inputs. As such, the pair of chromatic polarizers tends to have complementary transmission spectra if the objective is a neutral lens. The relationship may be different if the end result is a lens of a particular tint. Most importantly, the first chromatic polarizer, with absorption axis parallel to the PSS, filters light in relation to the underlying UVS color.

Optimization

In general, wavelength specific filtering can affect one or more of hue, chroma (saturation or colorfulness), and lightness. An improvement in perceived contrast between SSEs can result from manipulating one or more of these parameters. While a filter can enhance/suppress lightness contrast, for example, between an object and a background, changes tend to be incremental in comparison to normal variations in scene lightness, and the (simultaneous) contrast that a vision system must accommodate. For example, the lightness of a tennis ball and court can depend substantially on conditions in a manner that can dwarf incremental shifts due to a filter. Consider, for example, a clear blue sky with the sun at approximately 27°-incidence on a blue tennis court. Standing at one baseline and looking down the court toward the sun, a light meter (Konica-Minolta LS-100) measures a range in court brightness of approximately 1,000 to 5,000 cd/m$^2$, with the latter being the location of the glare hot-spot, and the former the corners. Using a spectralon (Lambertian white) reference, a light level of 15,000-18,000 cd/m$^2$ is observed (depending on observation angle). A tennis ball placed on the court is in shadow, so it measures at about 1,200 cd/m$^2$. However, when standing at the opposite baseline (with sun to back), the court is much more uniform due to relative lack of glare (800-1,200 cd/m$^2$). And because the ball is strongly illuminated, a peak light level of 30,000 cd/m$^2$ could be observed (due to combined scatter and fluorescence). So from a contrast perspective, a player facing glare may see a ball a factor of 4× weaker than the court, while the player with back to the sun, could observe a lightness contrast 30× stronger than the court. Clearly such variations are much larger than the incremental relative impact of a filter function. The more impactful aspect of the filter tends to be its effect on hue and saturation, and color difference between SSEs.

Removing lightness from the optimization, one metric describing the effectiveness of the filter is the color separation between two SSEs given by:

$$\Delta_{u'v'} = \sqrt{[u'_B - u'_C]^2 + [v'_B - v'_C]^2} \quad (2)$$

where $(u'_B, v'_B)$ is the color-coordinate for the first SSE, and $(u'_C, v'_C)$ is the color coordinate for the second SSE in u'v' space under the specific illumination conditions. This is one of many performance metrics that can be used to optimize for a particular application, which is subsequently applied to an in-depth design example.

In-Depth Design Example

Figure 2:
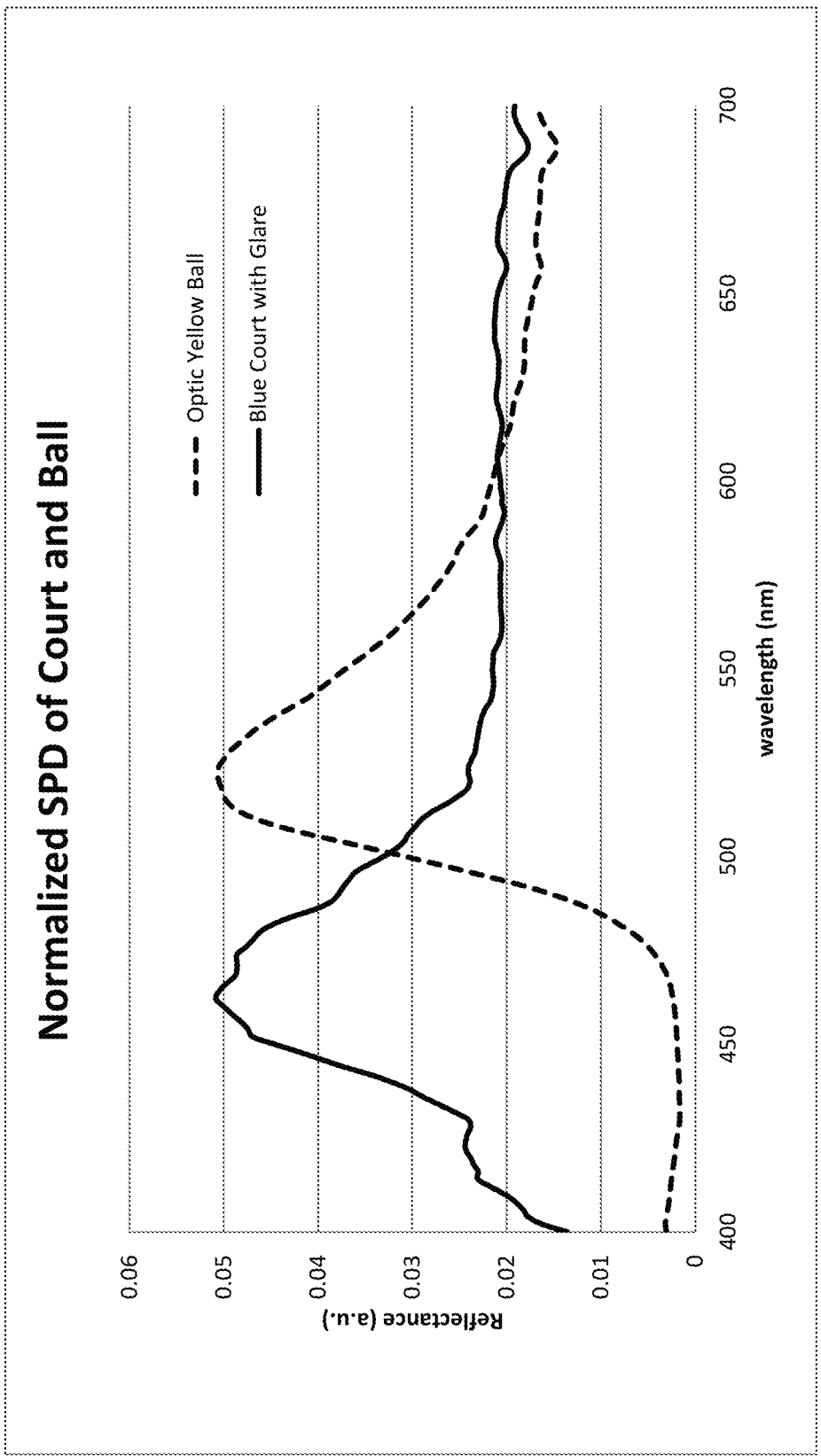
FIG. 2 shows normalized spectral power distribution (SPD) for a yellow tennis ball and a blue tennis court.

Outdoor tennis represents a good example for illustrating the inventive design principles. FIG. 2 shows the normalized SPD of a US Open Blue tennis court with PSS, along with a Wilson (optic-yellow) tennis ball, corresponding to Case 3. The latter is substantially unpolarized, including both a reflectance and a fluorescence contribution. Because the SPD functions have fairly complementary spectral elements, as well as differences in degree of polarization, there are two avenues for increasing color difference and hence perceptible contrast. These spectra both have significant contributions in the spectral cyan, so this can be considered the common band. However, the court has unique contributions at shorter wavelengths and the ball has unique contributions at longer wavelengths. In this instance, attenuating the common band can introduce a color separation, while preserving the fidelity of the scene hue (e.g. white point).

Filtering is fundamentally associated with a reduction in luminance, which is a requirement when the ambient light level is high. At lower luminance levels, loss may not be a perceived issue because the adaptation luminance may still fit well within acceptable limits. More specifically, it is still in the photopic range and pupil dilation does not significantly reduce visual acuity. And there are benefits of filtering that can offset luminance loss when the ambient light level is relatively low. Filtering can increase color separation, which can increase chroma of the ball or court, or both. It can also cause a shift in the hue of the ball or court, or both. An increase in chroma can leverage the Helmholtz-Kohlrausch (HK) effect. The perception that a more saturated object appears brighter than predicted by its luminance is both a function of chroma and hue. For saturated inputs, the HK effect is minimal in the yellow-green, and most pronounced for saturated red, blue or magenta colors where lightness can be more than twice that predicted for an achromatic object of equivalent luminance. As such, a filter can both narrow the SPD (increasing the chroma), and shift the hue toward a color with greater HK enhancement. Conversely, a filter can suppress peaks in an SPD to create a more neutral output, using both lumen reduction and the HK effect to reduce perceived lightness. In general, lightness constancy can shift the adaptation luminance, so contextually, the HK effect can create the perception that certain objects are brighter with the filter present than without.

Figure 3:
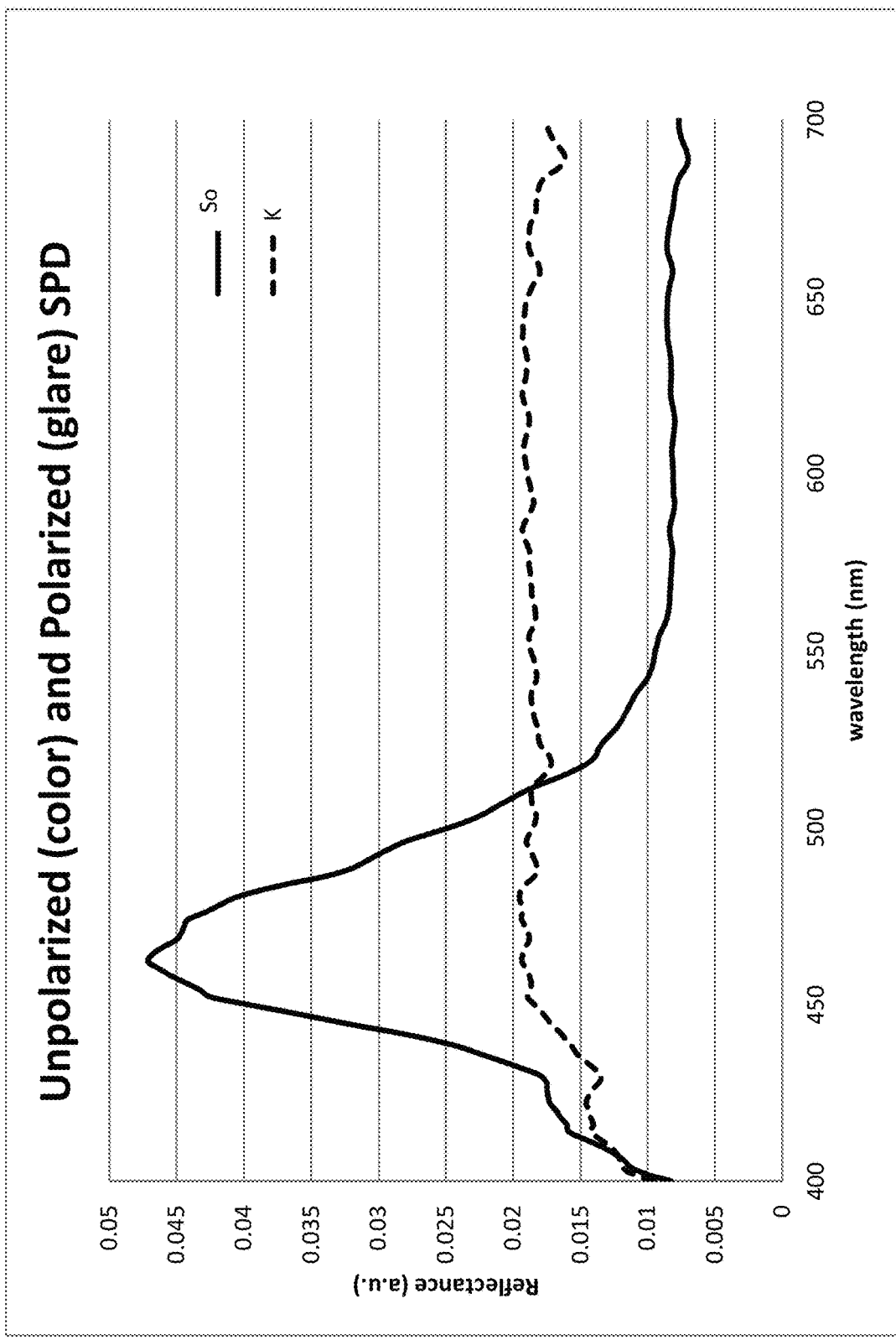
FIG. 3 shows measured polarized and unpolarized contributions of sunlight scattered from a blue tennis court.

Using the equations for UVS/USS, and PSS gives the SPDs of FIG. 3, which shows that the polarized part is substantially achromatic. In this case, the polarized glare has higher luminance than the unpolarized contribution. Using a neutral polarizer, as in conventional polarizing sunglasses, the polarized glare could be eliminated. This would increase the saturation of the court, though the unpolarized part also contains significant USS, that is not present in bulk measurements of the paint. Generally, the court SPD contains an unpolarized surface scatter that is substantially wavelength independent. Thus, further rejection of light that lies outside of the blue can enhance chroma.

In the absence of glare (using FIG. 2 for the ball, and the unpolarized court SPD (given by the solid line of FIG. 3)), the color coordinates for the ball and court are (0.166, 0.556) and (0.172, 0.372), respectively, giving $\Delta_{u'v'}$ =0.184. However, with glare present, the court color is desaturated to (0.194, 0.431), giving $\Delta_{u'v'}$ =0.128. These results can be compared to the filtered cases.

Note that the color difference metric says nothing specific about the color coordinate transformations of the ball and court, only giving their separation in u'v' space. This metric also does not explicitly capture the impact of the HK effect. While color separation is often accomplished by pushing color coordinates in opposite directions of the CIE diagram, often with each moving toward the locus (i.e. higher chroma), it is not mandated by this metric.

Example 1: Two-Stage PIF

Figure 4:
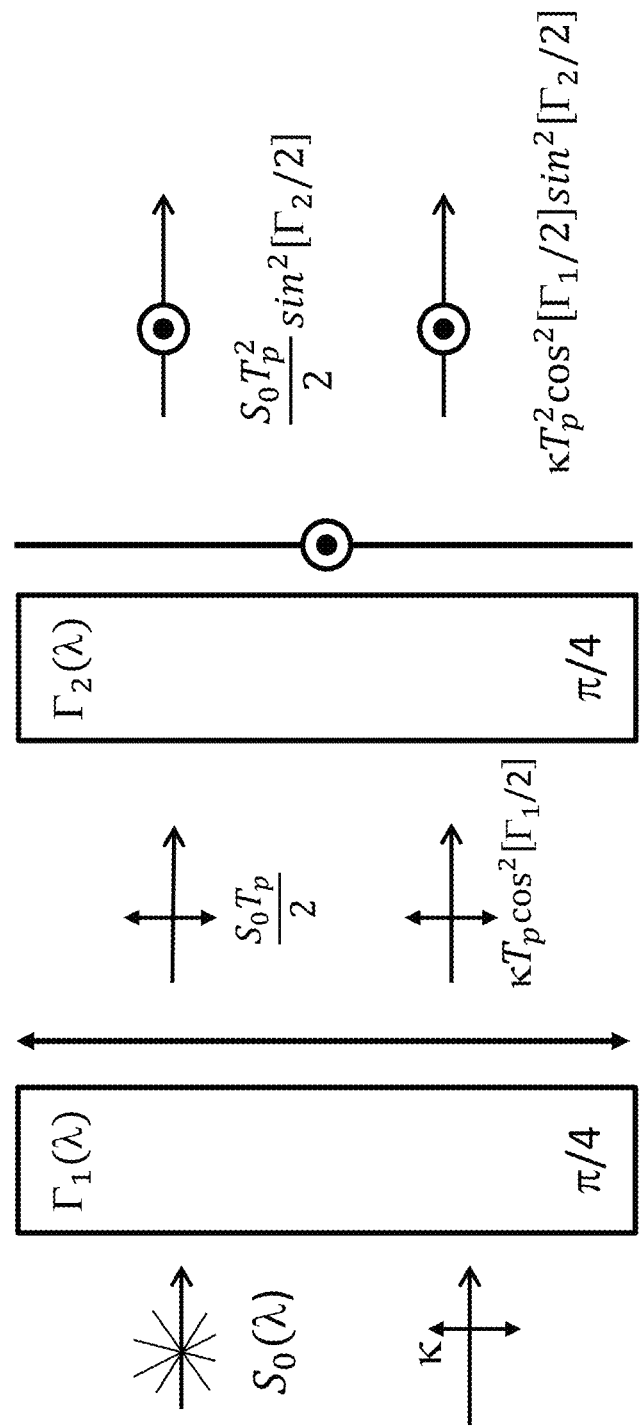
FIG. 4 shows a cross-section of a two-stage polarization interference filter, where the first stage acts only on a polarized input.

A cross-section of a polarization-interference based filter is shown in FIG. 4, which is a two-stage PIF with neutral polarizers. The input and output polarizers have crossed absorption axes, and the retarder optic axes are oriented at $\pm\pi/4$ with respect to the absorption axes. Note that the polarizers could also be parallel to each other, inverting the transmission spectrum, or could have other relative orientations. Each of the terms transmitted by this filter are shown, where it is assumed that there is a combined (UVS+ USS) given by $S_0(\lambda)$, and a PSS of amplitude $\kappa$, oriented parallel to the polarizer absorption axis. A portion of the PSS is transformed to the orthogonal state via the retardation, $\Gamma_1$, which is then absorbed by the first polarizer. For Example 1, 2.0 waves of retardation at 455 nm is used with a polycarbonate retarder, giving a retardation of 1.5 waves at 558 nm. So 455 nm (blue) light is transmitted without loss, while 558 nm light is fully absorbed. Unpolarized light incident on the filter is unaltered by the retarder and is polarized with a minimum of 50% loss by the initial polarizer.

Both components are then filtered identically by the second PIF stage. A compound retarder structure is used to maintain the normal-incidence retardation over a wide field-of-view (FOV). In this example, a pair of 1-wave retarders at 587 nm is used, with orientations ±45°. A two-layer achromatic rotator, as described in U.S. Pat. No. 9,933,636 is placed between these two retarders with orientations ±21.5°. The net effect of the structure is a full-wave of retardation at 413 nm, 500 nm, and 673 nm, with a half-wave of retardation at 450 nm and 568 nm. The second (parallel) polarizer absorbs light, such that transmission minima occur at the full-wave retardation wavelengths, with peaks at the half-wave retardation wavelengths. The net SPD transmitted by the filter is given by:

$$S = \frac{S_0 T_p^2}{2}\sin^2[\Gamma_2/2] + \kappa T_p^2 \cos^2[\Gamma_1/2]\sin^2[\Gamma_2/2] \quad (3)$$

Assumes identical neutral polarizers with insignificant T_s. Note that the polarizers can be either parallel or crossed depending on retardation.

Figure 5:
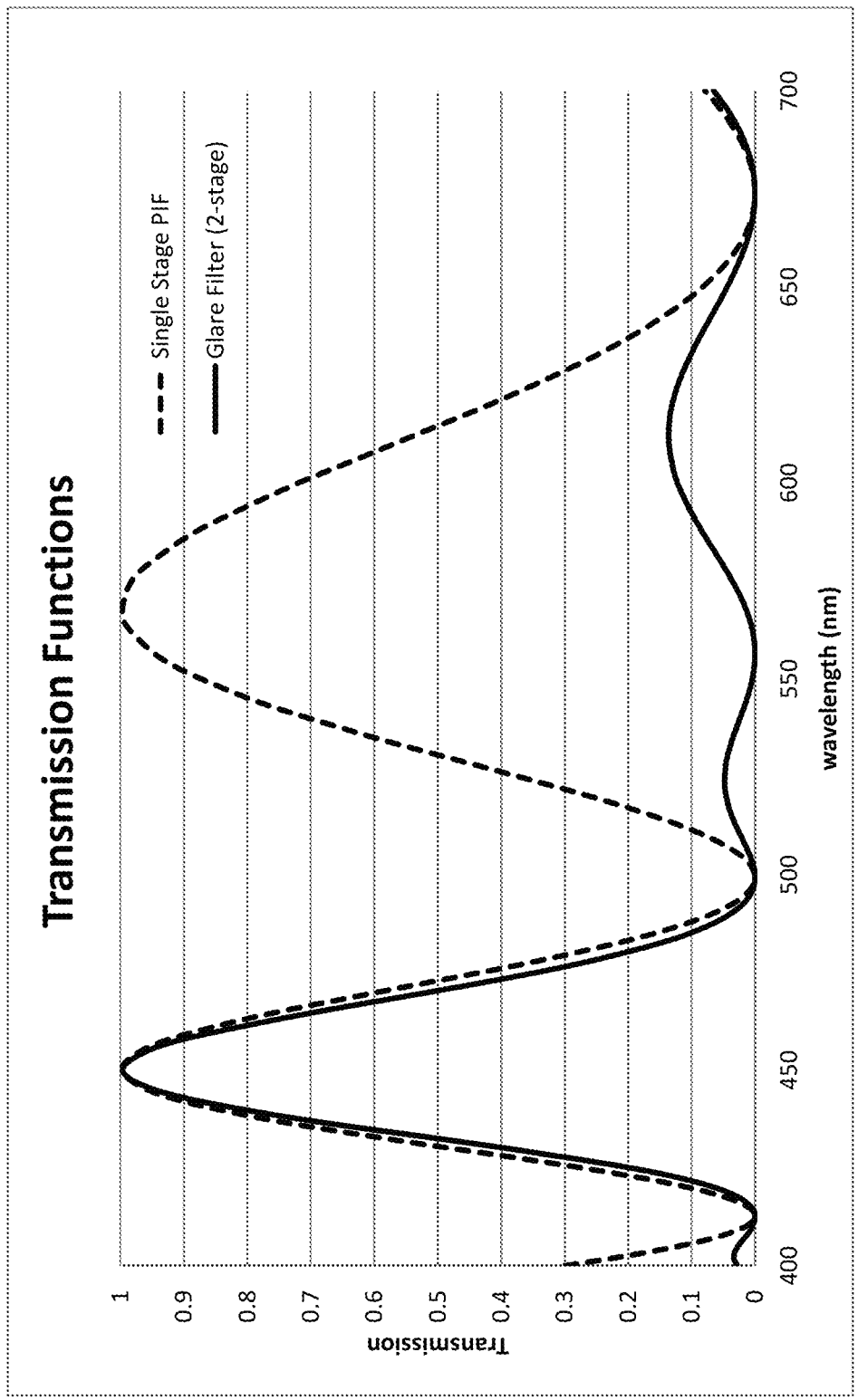
FIG. 5 shows filter transmission spectra for polarized and unpolarized inputs.

FIG. 5 shows the transmission functions corresponding to the polarized (solid) and unpolarized (dashed) light components incident on the filter. Single retarder for stage 1:2.0 waves at 455 nm. WFE for stage 2, 1 wave at 592 nm, +−21.5 HW at 516 nm.

Part of the selection criteria for the second stage retardation is preservation of color fidelity. Consider a spectrally flat input SPD with a white point on the black-body curve (approximately 5,500 K). If the two-peak spectrum is shifted via a change in $\Gamma_2$, there is an associated shift in lens tint. When the retardation is 1.0 waves at 587 nm, the color coordinate lies on the black-body curve. For lower retardation, green is increased relative to red, and the coordinate moves above the blackbody curve. Conversely, when the retardation is increased, red is increased relative to green and the coordinate falls below the blackbody curve. The value selected reflects a feature of the techniques disclosed herein that the transmission spectrum can preserve the white point (such as the lines on the court) if so desired. With this value, the white point shift is 0.005, which is below a just-noticeable-difference (JND).

Using Equation 1, the polarized and unpolarized terms can be extracted from the orthogonal measurements of FIG. 2, giving FIG. 3. The unpolarized volume scatter term is denoted $S_0$ ($\Delta$) and the achromatic surface glare is denoted K. In the absence of glare (solid line of FIG. 3) the court color has a relatively high chroma, and as such, the opportunity to improve the color is limited. Using Equation 1 with no glare ($\kappa$=0), the spectrum is further improved to coordinates (0.195, 0.343), primarily due to the nulls at 500 nm and 673 nm. That is, the second stage acts on the unpolarized input to improve the color in part by filtering the USS. The color of the ball is shifted, as the SPD is shaped by the yellow lobe of the filter. The filtered ball color coordinate is (0.184, 0.562). The color separation becomes $\Delta_{u'v'}$=0.219, representing an improvement over the unfiltered case of 19% (i.e. 0.184 to 0.219).

Using Equation 1 with glare present, the benefits of the filter are more pronounced. The filtered color coordinates for the court with glare are (0.210, 0.297), with the filtered color of the ball substantially unchanged, giving a color difference of $\Delta_{u'v'}$=0.266. This represents an improvement over the unfiltered case of 108% (i.e. 0.128 to 0.266). Additionally, the filtered color of the court with glare present is more saturated than the filtered color without glare, which is of course more saturated than the unfiltered color without glare. This can be compared to the case of a neutral polarizing filter that blocks the glare ($\Delta_{u'v'}$=0.184), where the improvement is 44%.

FIG. 5 also shows very effective blocking of HEB (high energy blue) wavelengths with glare present, which is beneficial to eye safety. While the transmission increases below 415 nm for unpolarized light, this can easily be extinguished using the wavelength dependence of the polarizer, $T_p$. A pair of polarizers with significant transmission roll-off at such short wavelengths is easily obtained.

Figure 6:
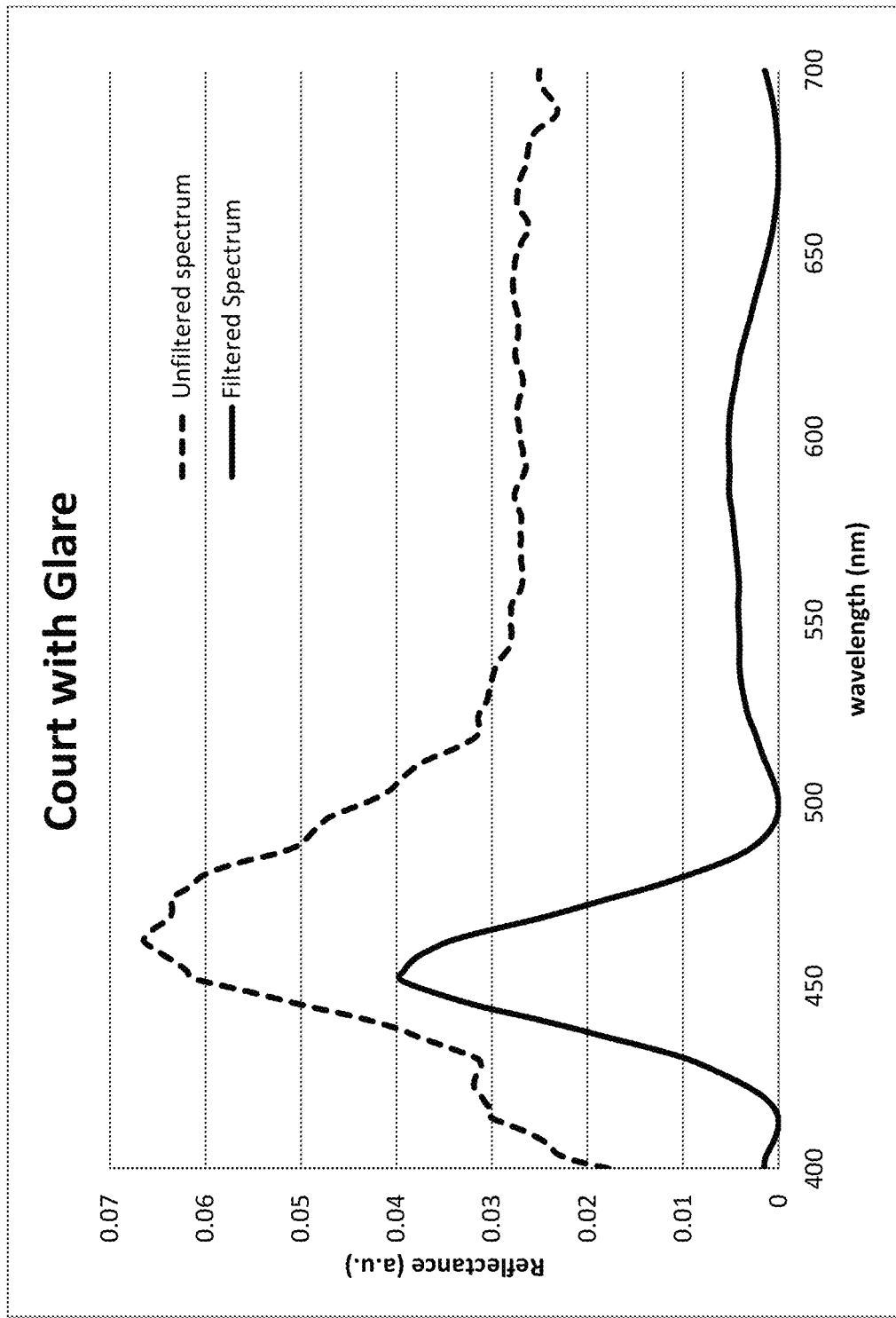
FIG. 6 shows the SPD for a blue tennis court with glare unfiltered (dashed) and filtered (solid).

FIG. 6 shows the SPD for the blue tennis court with glare, both unfiltered (dashed) and filtered (solid).

The photopic transmission of full-spectrum white (or visible light transmission, VLT) through the filter due only to the sinusoid is 64%. Using a pair of high transmission neutral dye-stuff polarizers (90% polarized VLT), and AR coatings, a filter with an unpolarized VLT of 26% is feasible. Of course, this can easily be reduced as desired for a high-ambient filter.

Note that the optimized filter is based on specific input SPDs. While it is designed to have white color balance, the use of a yellow bandpass means that the red-green opponent signal is suppressed. The court and ball will look more vibrant with enhanced contrast because the blue-yellow opponent signal is emphasized, but the appearance of reddish and greenish objects tends to be relatively muted. Table 1 gives a summary of the performance attributes of the Example 1 filter.

TABLE 1

Tennis filter performance

| Characteristic of Output | Result of Filtering |
|---|---|
| HEB Transmission | <20% below 425 nm |
| White Point Shift | 0.005 (below a JND) for lines/net |
| Ball Color | Shift to yellow, increased chroma |
| Court Color (no glare) | Shift to blue, increased chroma |
| Court Color (with glare) | Further shift to blue, further increased |

TABLE 1-continued

Tennis filter performance

| Characteristic of Output | Result of Filtering |
| --- | --- |
| Color Separation (ball: court), no glare | chroma 0.219 (19% improvement) |
| Color Separation (ball: court), with glare | 0.266 (108% improvement) |
| VLT | 26% max unpolarized, lower is feasible |

Other PIF configurations with color balance are also feasible. A 2.0-wave retarder at 572 nm between parallel polarizers is 72% efficient, with a short-wave blue peak at 427 nm, and a null at 483 nm. A 3.0-wave retarder at 570 nm between parallel polarizers is 60% efficient, with a longer wave blue peak at 460 nm, a cyan null at 506 nm and a long-red null at 663 nm. The addition of an input retarder giving a peak at the appropriate blue wavelength for filtering polarized glare is also feasible, as demonstrated in Example 1.

Example 2: Chromatic Polarizer

In principle, chromatic polarizer optical density along the absorption axis can be prescribed as a function of wavelength in accordance with filter optimization. The polarizing efficiency (PE) depends upon the optical density and thickness of the dye layer, where the PE is defined in the usual manner (PE=(parallel polarizer transmission−crossed polarizer transmission)/(parallel polarizer transmission+crossed polarizer transmission)). In practice, limitations in dye chemistry tend to constrain peak transmission, transition slope, and optical density, particularly for short-pass filters.

Moreover, the transmission spectrum along the absorption axis is not independent of the transmission spectrum perpendicular to the absorption axis. Often, the best solution is to produce a desired transmission along the absorption axis, with a neutral transmission perpendicular to the absorption axis. Given that scenario, a pair of different chromatic polarizers can produce a desired overall transmission when their axes are crossed.

The wavelength dependent input polarizer transmission is represented by $(T_p, T_a)$, and the output polarizer transmission is represented by $(T'_p, T'_s)$. The eye responds to the sum of all terms associate with the filtered SPD, or:

$$S(\lambda) = \frac{S_0(\lambda)}{2}(T'_p T_s + T_p T'_s) + \kappa T'_p T_s. \quad (4)$$

The wavelength dependence of $T_s$ can be selected in accordance with the techniques disclosed herein to filter the PSS, where $T'_p$ could be relatively achromatic. The chromatic loss in PE of the input polarizer shifts the white-point for unpolarized inputs, as discussed previously. However, the PE associated with the output polarizer ($T'_s$) is an independent parameter that can compensate for this. It can be selected in such a way that the composite lens tint is acceptable/desirable.

Figure 7:
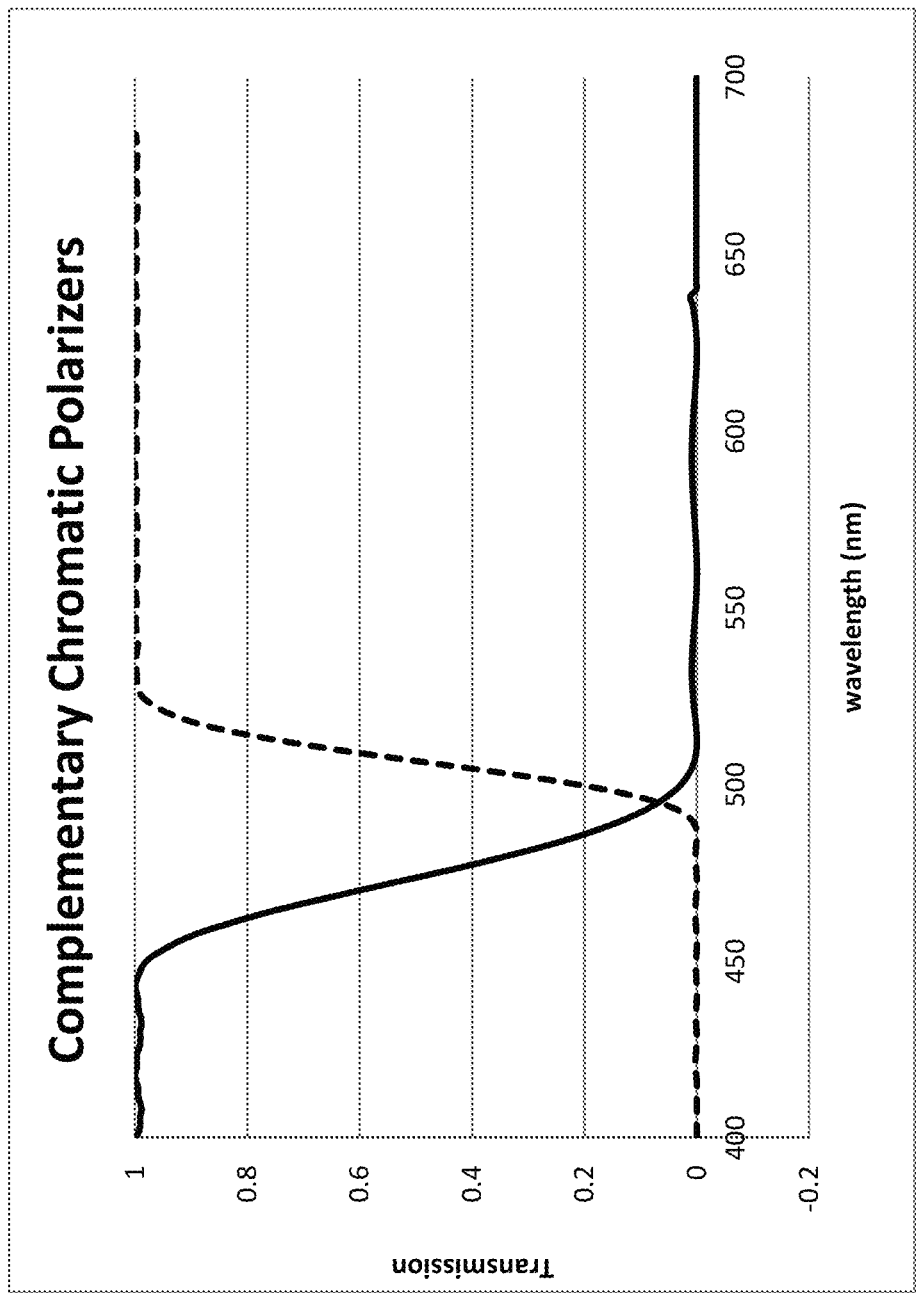
FIG. 7 shows the spectra for an ideal blue/yellow chromatic polarizer.
Figure 8:
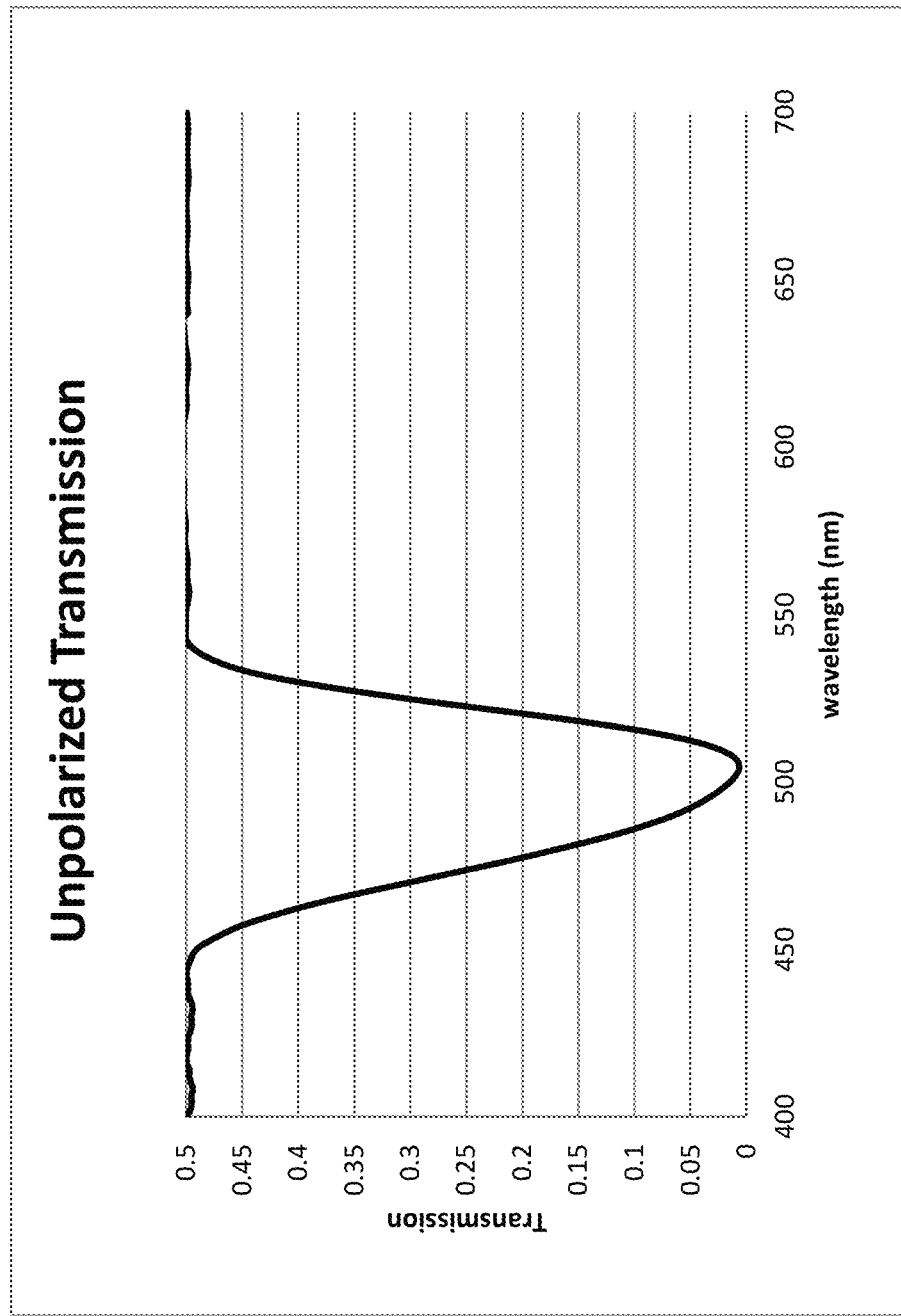
FIG. 8 shows a composite transmission for unpolarized input showing a cyan notch.
Figure 9:
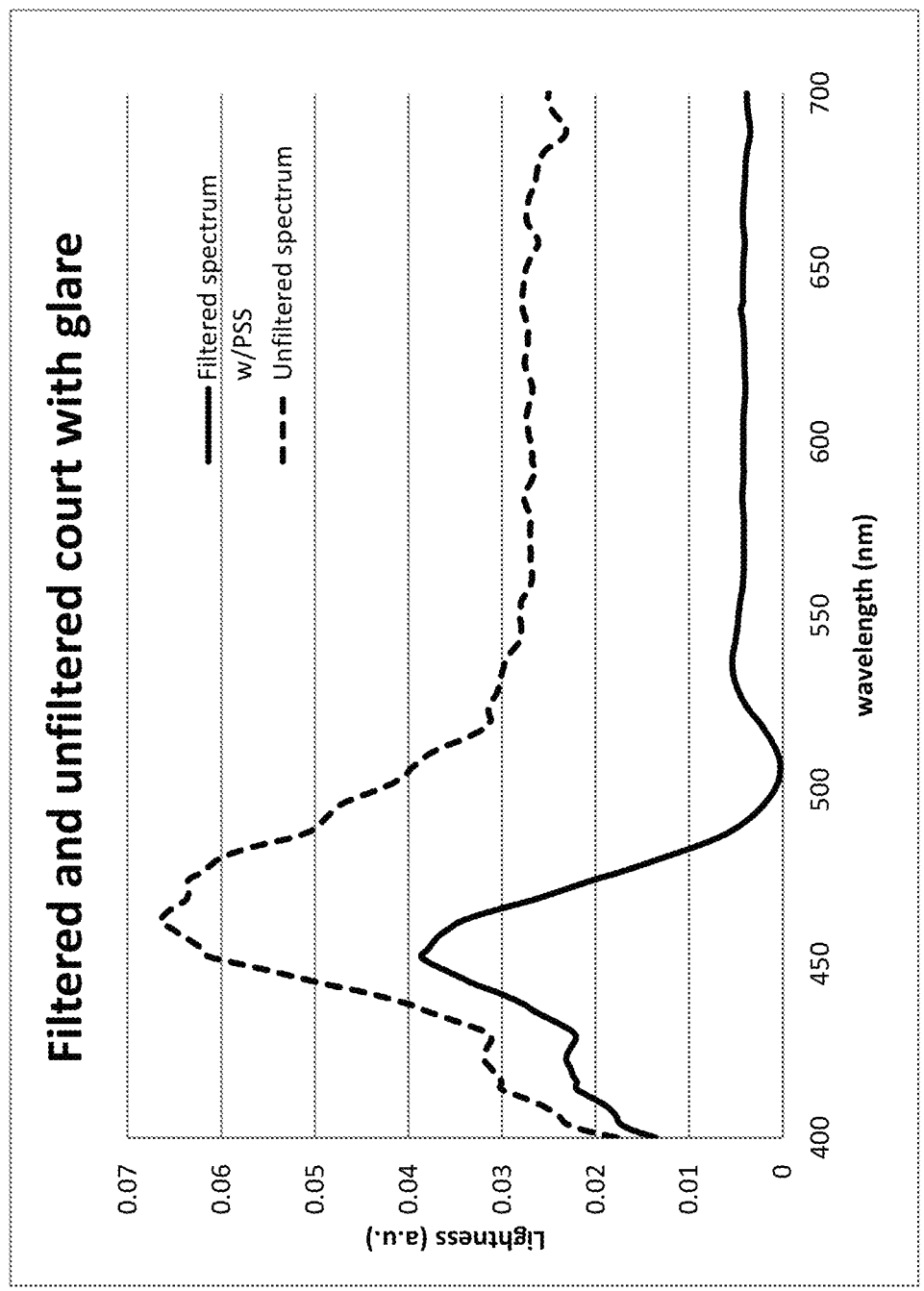
FIG. 9 shows the SPD for a filtered and unfiltered blue court with glare (FIG. 3) using a chromatic polarizer with the spectra of FIG. 7.

FIG. 7 shows example computer generated spectra for the $T_s$ (blue) and $T'_s$ (yellow) chromatic polarizers, where the value for $T_p$ and $T'_p$ is taken to be unity. For this example, the spectra are non-overlapping, deliberately generating a notch in the cyan as shown in the composite transmission functions for an unpolarized input, shown in FIG. 8. This notch produces a lens tint that is pinkish (0.264, 0.464). Were the spectra to overlap at the 50% point, the notch could be greatly reduced. Using the above equation and the spectra of FIG. 3, court and ball color coordinates can be generated from $S(\lambda)$. In the absence of PSS, the filtered court color is (0.210, 0.365), and in the presence of PSS it is (0.220, 0.257). The filtered ball color is (0.426, 0.524). When no PSS is present, the court color does not improve very much (5%), because the cyan notch has little effect on performance. However, the highly filtered PSS dramatically shifts the composite court color, and the notch shifts the ball color toward the yellow. FIG. 9 shows a comparison of the filtered court with glare (FIG. 3) using the chromatic polarizer of FIG. 7 to the unfiltered court. With PSS present, the color separation between ball and court is $\Delta_{u'v'}=0.301$. This is an improvement of 137%, which for the case of an ideal blue chromatic polarizer is better than the previous example.

Example 3

Hybrid configurations can also be considered which include one or two-stage polarization interference with combinations of chromatic and neutral polarizers. An example where this could be relevant stems from the fact that PSS can be very intense relative to UVS. Therefore a small amount of chromatic leakage from a polarizer can have a significant impact on the composite color, while still preserving the benefits of the PIF for unpolarized inputs. As stated earlier, this can also aid a viewer in recognizing the presence of a medium with significant PSS, while still allowing see-through.

Reduced PE of one or more polarizers at specific wavelengths can also be used to increase the throughput at those wavelengths. It can also introduce another mechanism for shaping the transmission profile in the event that the optimum spectrum is not achievable with the constraints of polarization interference filtering. Since the PIF requires both polarizers to perform their function for an unpolarized input, loss of PE in either is sufficient to spoil the interference effect. For the polarized portion, polarization interference only requires that the output polarizer provide adequate PE.

A general filter stage that uses independent chromatic polarizers and polarization interference has an output spectrum given by:

$$S(\lambda) = \frac{S_0(\lambda)}{2}[(T_s T'_p + T_p T'_s) + (T_p - T_s)(T'_p - T'_s)\cos^2 \Gamma/2] + \kappa T_s[T'_s + (T'_p - T'_s)\sin^2 \Gamma/2] \quad (5)$$

with parallel polarizers, where the phase-inverted SPD is obtained with an achromatic half-wave shift in retardation. The first term of $S(\lambda)$ represents the filtered unpolarized input ($S_0(\lambda)$), which is the sum of two contributions. The first contribution (C1) represents light that is either not polarized by the input polarizer, or not analyzed by the output polarizer. It can be recognized as the total transmission of unpolarized light with crossed polarizers, and is free of any polarization interference. The second contribution (C2) represents light that is both polarized and analyzed, and as such, is fully modulated by polarization interference.

The above shows that the unpolarized input is modulated by a sinusoid with period determined by the retardation, Γ, with amplitude determined by an envelope function. The envelope function has maximum value given by the total transmission of parallel polarizers ($T_pT'_p+T_sT'_s$), with minimum value given by the total transmission of crossed polarizers ($T_sT'_p+T_pT'_s$).

The second term also contains two contributions, representing the linearly polarized part of the input SPD filtered along the absorption axis of the input polarizer. The first contribution (C3) is the light that is also filtered along the absorption axis of the output polarizer. Because it represents the polarized input that is not analyzed, it is not modulated by polarization interference. The second contribution (C4) is analyzed by the output polarizer. It is fully modulated by polarization interference, and is anti-phase with the previous polarization interference part because the polarizations are orthogonal at the input.

Figure 10:
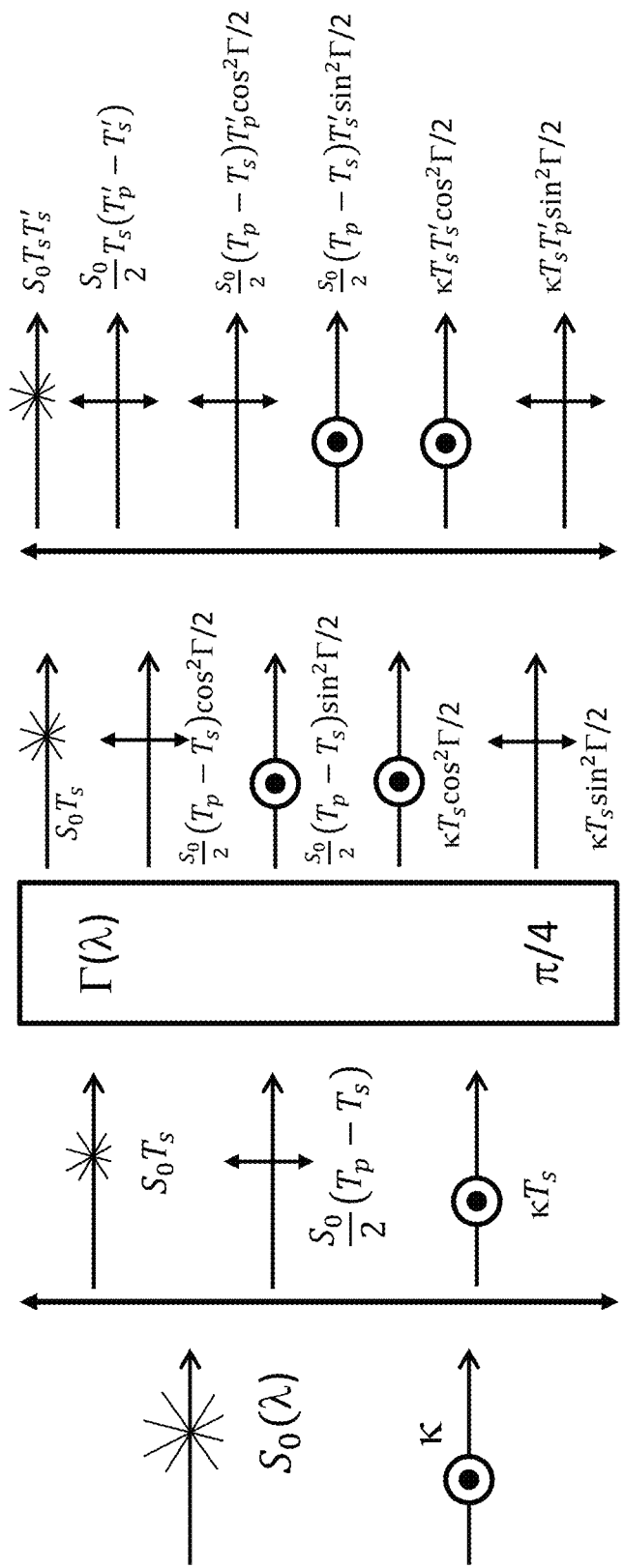
FIG. 10 shows a cross-section of a single stage polarization interference filter with general input/output polarizers.

FIG. 10 shows a single-stage PIF with chromatic polarizers, or in other words, a filter stage with input/output polarizers having arbitrary wavelength dependent PE, bounding a single retarder oriented at 45°. The polarizer transmission of the input polarizer is given by ($T_p$, $T_s$) and that of the output is ($T'_p$, $T'_s$).

Note that a second retarder could be placed at the input, much like Example 1. In this case, the transmission function for the polarized input contains four terms, but there is no change to the transmission for an unpolarized input.

Figure 11:
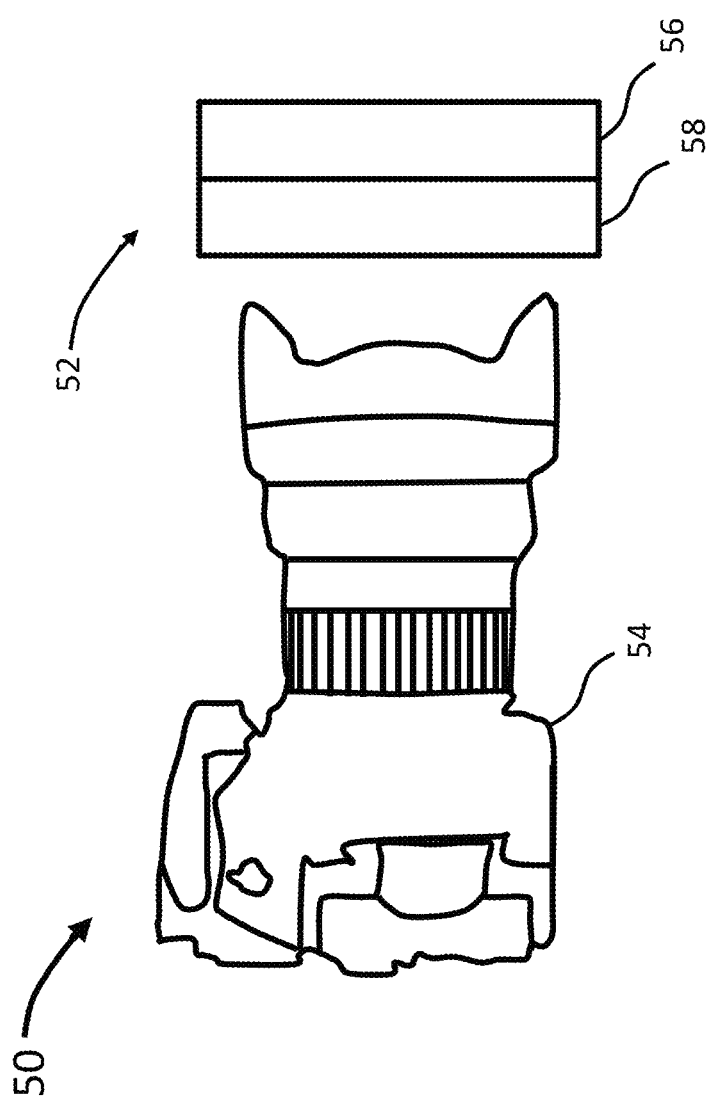
FIG. 11 shows the use of a filter as described herein with an image capture device.

FIG. 11 shows a configuration (50) that provides enhanced electronic image capture. It includes a two-stage filter (52) positioned in front of a digital camera (54). The filter contains a polarization sensitive filter function (56), and a polarization insensitive filter function (58) that may proceed or follow (56). The camera can represent any color sensitive receiver, including discrete sensors, various array devices, or the eye.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. An optical filter receptive of incoming light having at least a chromatic unpolarized volume scatter component and a polarized surface scatter component, the unpolarized volume scatter component having a first spectral power distribution (SPD), wherein the polarized surface scatter component has an angular orientation, the filter comprising:
one or more optical elements that together have an orientation-sensitive spectral transmission function for filtering the polarized surface scatter component of the incoming light differently from the unpolarized volume scatter component of the incoming light.

2. An optical filter as defined in claim 1, wherein the optical filter is an eyewear lens.

3. An optical filter as defined in claim 1, wherein the optical filter is a camera filter.

4. An optical filter as defined in claim 1, wherein the orientation-sensitive spectral transmission function increases chroma of the polarized surface scatter component of the incoming light.

5. An optical filter as defined in claim 4, wherein the optical filter also receives light from a salient scene element with a second spectral power distribution (SPD) and wherein the optical filter increases the color difference between the first and second received light.

6. An optical filter as defined in claim 5, wherein the first SPD represents a blue tennis court and the second SPD represents a yellow tennis ball.

7. An optical filter as defined in claim 5, wherein the first SPD represents a basketball court and the second SPD represents a basketball.

8. An optical filter as defined in claim 5, wherein the first SPD represents green foliage and the second SPD represents a golf ball.

9. An optical filter as defined in claim 5, wherein the first SPD represents a body of water and the second SPD represents a water craft.

10. An optical filter as defined in claim 5, wherein the first SPD represents the sky and the second SPD represents a cloud.

11. An optical filter as defined in claim 5, wherein the optical filter substantially preserves perceived color of neutral objects.

12. An optical filter as defined in claim 1, wherein the orientation-sensitive spectral transmission function shifts a color coordinate of the polarized surface scatter component of the incoming light toward a color coordinate of the chromatic unpolarized volume scatter component of the incoming light.

13. An optical filter as defined in claim 1, wherein the optical filter further contains a spectral transmission function that filters both the chromatic unpolarized volume scatter component of the incoming light and the polarized surface scatter component of the incoming light in a manner that increases the color difference between the chromatic unpolarized volume scatter component of the incoming light and the polarized surface scatter component of the incoming light.

14. An optical filter as defined in claim 1, wherein the optical filter further contains a spectral transmission function that filters both the chromatic unpolarized volume scatter component of the incoming light and the polarized surface scatter component of the incoming light in a manner that increases the saturation of at least one of the chromatic unpolarized volume scatter component of the incoming light and the polarized surface scatter component of the incoming light.

15. An optical filter as defined in claim 1, wherein the optical filter includes a first stage and a second stage, wherein the first stage filters the polarized surface scatter component of the incoming light and the second stage filters at least one of the chromatic unpolarized volume scatter component of the incoming light and the polarized surface scatter component of the incoming light.

16. A optical filter as defined in claim 1, wherein the filtering differently includes the spectral transmission function being different.

17. An optical filter receptive of incoming light having at least a chromatic unpolarized volume scatter component and a polarized surface scatter component, wherein the polarized surface scatter component has an angular orientation, the filter comprising:
a chromatic polarizer with an absorption axis oriented parallel to the angular orientation of the polarized surface scatter component;
wherein a transmission spectrum along the absorption axis of the chromatic polarizer shifts a color coordinate of the polarized surface scatter component of the incoming light toward a color coordinate of the unpolarized volume scatter component of the incoming light.

18. An optical filter receptive of incoming light having at least a chromatic unpolarized volume scatter component and a polarized surface scatter component, wherein the polarized surface scatter component has an angular orientation, the filter comprising:
   one or more input retarders configured to produce a wavelength-dependent state-of-polarization;
   a linear polarizer receptive of light passing through the one or more input retarders, the linear polarizer having an absorption axis oriented either parallel to or perpendicular to the angular orientation of the polarized surface scatter component of the incoming light;
   wherein the transmission spectrum of the optical filter shifts a color coordinate of the polarized surface scatter component of the incoming light toward a color coordinate of the unpolarized volume scatter component of the incoming light.

19. An optical filter as defined in claim 18, wherein a spectral transmission of the optical filter is determined only by a transmission function of the linear polarizer for the unpolarized volume scatter component of the incoming light.

20. An optical filter as defined in claim 19, wherein a spectral transmission of the optical filter is determined both by a transmission function of the linear polarizer and by a transmission function of the input retarders for the polarized surface scatter component of the incoming light.

21. An optical filter as defined in claim 18, wherein a spectral transmission of the optical filter is determined both by a transmission function of the linear polarizer and by a transmission function of the input retarders for the polarized surface scatter component of the incoming light.

* * * * *